(12) United States Patent
Packirisamy et al.

(10) Patent No.: US 10,615,440 B2
(45) Date of Patent: Apr. 7, 2020

(54) SCALABLE MICRO POWER CELLS WITH NO-GAP ARRANGEMENT BETWEEN ELECTRON AND PROTON TRANSFER ELEMENTS

(71) Applicants: Muthukumaran Packirisamy, Pierrefonds (CA); Mehdi Shahparnia, Verdun (CA)

(72) Inventors: Muthukumaran Packirisamy, Pierrefonds (CA); Mehdi Shahparnia, Verdun (CA)

(73) Assignee: Muthukumaran Packirisamy, Pierrefonds (CA)

(*) Notice: Subject to any disclaimer, the term of this patent is extended or adjusted under 35 U.S.C. 154(b) by 741 days.

(21) Appl. No.: 14/349,959

(22) PCT Filed: Oct. 4, 2012

(86) PCT No.: PCT/CA2012/050703
§ 371 (c)(1),
(2) Date: Apr. 4, 2014

(87) PCT Pub. No.: WO2013/049940
PCT Pub. Date: Apr. 11, 2013

(65) Prior Publication Data
US 2014/0255730 A1  Sep. 11, 2014

Related U.S. Application Data

(60) Provisional application No. 61/543,896, filed on Oct. 6, 2011, provisional application No. 61/543,064, filed on Oct. 4, 2011.

(51) Int. Cl.
*H01M 8/16* (2006.01)
*H01M 8/1004* (2016.01)
*H01M 8/1023* (2016.01)

(52) U.S. Cl.
CPC .......... *H01M 8/16* (2013.01); *H01M 8/1004* (2013.01); *H01M 8/1023* (2013.01); *Y02E 60/527* (2013.01)

(58) Field of Classification Search
None
See application file for complete search history.

(56) References Cited

U.S. PATENT DOCUMENTS

| 7,160,637 B2 | 1/2007 | Chiao et al. | |
| 2009/0297908 A1* | 12/2009 | Kohl | H01M 4/881 429/535 |
| 2009/0305089 A1* | 12/2009 | Minteer | C12N 11/00 429/401 |
| 2010/0304458 A1 | 12/2010 | Bombelli | |
| 2012/0247979 A1* | 10/2012 | Ko | B01L 3/502746 205/792 |

FOREIGN PATENT DOCUMENTS

| JP | 2011-054291 A | 3/2001 |
| WO | 2010/117844 A2 | 10/2010 |
| WO | 2011/038453 A1 | 4/2011 |

OTHER PUBLICATIONS

Chen et al, "XPS investigation of Nafion® membrane degradation", Journal of Power Sources, vol. 169, Issue 2, Jun. 20, 2007, pp. 288-295.*
International Search Report and Written Opinion dated Jan. 10, 2013 for corresponding PCT Application No. PCT/CA2012/050703, 10 pages.
Furukawa, Yuji et al., "Design principle and prototyping of a direct photosynthetic/metabolic biofuel cell (DPBFC)", The Fifth International Workshop on Micro and Nanotechnology for Power Generation and Energy Conversion Applications, PowerMEMS 2005, Nov. 28-30, 2005, pp. 182-185.
Han, Yujie et al., "Conducting Polyaniline and Biofuel Cell", International Journal of Green Energy, Jun. 2006, 3(1), pp. 17-23.
Chiao, Mu et al., "Micromachined microbial and photosynthetic fuel cells", J. Micromech. Microeng., 16 (2006), pp. 2547-2553.
Lam, K. B. et al., "A MEMS Photosynthetic Electrochemical Cell Powered by Subcellular Plant Photosystems", Journal of Microelectromechanical Systems, vol. 15, No. 5, Oct. 2006, pp. 1243-1250.
Qian, Fang et al., "Miniaturizing microbial fuel cells", Trends in Biotechnology, vol. 29, No. 2, Feb. 2011, pp. 62-69.
Shah, K. et al., "Novel microfabrication approaches for directly patterning PEM fuel cell membranes", Journal of Power Sources, 123 (2003), pp. 172-181.
Wook Lee, Jin et al., "A perspective on microfluidic biofuel cells", Biomicrofluidics, 4, 041301 (2010), pp. 041301-1 to 041301-12.
Wing Yin Chow, Winnie et al., "Microfluidic channel fabrication by PDMS-interface bonding", Smart Mater. Struct., 15 (2006), pp. S112-S116.

* cited by examiner

Primary Examiner — Ladan Mohaddes
(74) Attorney, Agent, or Firm — Stinson LLP

(57) ABSTRACT

A power cell and a method for fabricating a power cell including two body portions and a proton exchange membrane (PEM) there between. The body portions each include a reaction chamber for holding an anolyte solution including a photosynthetic organism or a catholyte solution. At least one body portion has an optically transparent window to allow light into the reaction chamber enabling a photosynthetic reaction. A thin metal layer is coated directly on each of first and second surfaces of the PEM and then the two body portions are coupled together with the PEM located there between. Coating the first thin metal layer on the surfaces of the PEM involves coating a thin gold layer onto the surface, covering the gold layer with a layer of photoresist, patterning the photoresist layer through a mask, exposing the photoresist layer to ultraviolet radiation, and removing the unexposed photoresist.

20 Claims, 13 Drawing Sheets

Step 1   Silicon Wafer

Step 2 – PR spin coating

Step 3 – UV exposure

Step 4 – Developing

Step 5 – Placing PEM

Step 6 – PEM Attachment

Step 7 – Metal Sputtering

Step 8 – PR Spin Coating

Step 9 – UV Exposure

Step 10 – Developing

Step 11 – Metal Etching

Step 12 – Flood Exposure

Step 13 – Developing

Step 14 – PEM Attachment

Step 15 – PEM Flipping and Reattachment

Step 16 – Redo *Steps 7-13*

Step 17 – Final Detachment

SCALABLE MICRO POWER CELLS WITH NO-GAP ARRANGEMENT BETWEEN ELECTRON AND PROTON TRANSFER ELEMENTS

RELATED APPLICATION

This application claims the benefit of and is a National Phase Entry of International Application Number PCT/CA2012/050703 filed Oct. 4, 2012, and claims the benefit of U.S. Provisional Patent Application No. 61/543,064 filed on Oct. 4, 2011 and of U.S. Provisional Patent Application No. 61/543,896 filed on Oct. 6, 2011, all of which are incorporated herein by reference in their entirety.

TECHNICAL FIELD

The application relates to alternative energy sources for use in power cells.

BACKGROUND

Various compact power-generating devices have been developed in recent years. Fuel cells are one of the most promising systems. The advantages of fuel cells over batteries include usage of continuously replenished reactants, no moving parts and reduced thermal conversion. A particular disadvantage of fuel cells is insufficient ionic conductivity of the electrolyte. Micro-scale fuel cells are currently being investigated in an attempt to provide solutions to the latter problem.

Heat engines remain the primary choice for power conversion at many large scale power plants. Based on the power generation scale, different energy sources are used ranging from natural gas to coal to nuclear. Hydrocarbon fuels containing chemical energy are used in micro heat engines. Although the second law of thermodynamics puts a limit on the conversion efficiency of the heat engines, larger energy densities are achieved compared to lithium-ion batteries. The very first micro heat engine was developed at MIT in the 1990s. Soon after, internal combustion engines and steam engines on micro scale were developed and tested. Large viscous losses resulting from a thin boundary layer were found as one of the main disadvantage of these micro heat engines.

Thermophotovoltaics (TPV) is another class of energy conversion system. Here power generation is based on a heated emitter radiating photons which are then absorbed by a photocell and converted to electricity. This concept is very close to solar cells with one major difference—the source of radiation to power the cells. Although the emitter can be heated by sunlight, in order to provide sufficient temperature for efficient operation, extremely large beam concentrators are required which make this choice not very practical. Hence, the emitter is usually heated by combustion, providing a great deal of versatility in potential fuels. Higher power densities compared to solar cells are reported since the emitter and the photocell are in close proximity. The current challenges in TPV applications on a large scale include design, fabrication and material selection.

Solar cells are arguably the most thoroughly explored energy conversion systems. A photo-effect in semiconductors is due to generation of electrons and holes as a result of light absorption. When a semiconductor is brought in contact with an electrolyte containing a reduction-oxidation (redox) system, equilibrium is achieved by electron exchange at the interface. Illuminating a semiconductor reduces the band bending of the semiconductor and generates a photo-voltage acting as the driving force for the electron exchange.

In a typical photovoltaic (PV) module, photons of longer wavelength do not generate electron-hole pairs. That respective portion of the light energy is converted to heat. The working temperature of such a device is increased and the cell efficiency is thereby reduced. Structural damage may also occur due to overheating of the device. Thus, photovoltaic/thermal hybrid solar systems were introduced, enabling production of both electricity and heat from one integrated system. One example system is a combination of TPV and solar-assisted heat pump systems with a TPV panel directly coupled to the heat pump.

There is a general need for further alternative fuel cell developments.

SUMMARY

According to some embodiments of the invention, there is provided a method for fabricating a power cell comprising: fabricating at least two portions that collectively form the power cell, each portion comprising a reaction chamber and at least one of the two portions having an optically transparent window in contact with the reaction chamber to allow light into the reaction chamber; fabricating a proton exchange membrane (PEM) comprising a first electrode in direct contact with a first main surface of the PEM and a second electrode in direct contact with a second main surface of the PEM; coupling the at least two portions to one another with the PEM located between the at least two portions.

In some embodiments the method further comprises, prior to coupling the at least two portions to one another, treating the PEM to increase ionic conductivity.

In some embodiments treating the PEM comprises: submerging the PEM in distilled water between 65° C. to 85° C. for 20 to 40 minutes; submerging the PEM in hydrogen peroxide between 65° C. to 85° C. for 20 to 40 minutes; submerging the PEM in diluted sulfuric acid between 50° C. to 70° C. for 20 to 40 minutes; and rinsing the PEM at least once for 20 to 40 minutes in distilled water.

In some embodiments the method further comprises making a mold used in fabricating the at least two portions.

In some embodiments making the mold comprises forming elements in the mold that form one or more of: the reaction chamber, at least one inlet; at least one outlet; and at least one fluidic channel for connect an inlet or outlet to the reaction chamber, in the at least two portions.

In some embodiments the method further comprises fabricating the at least two portions using one or more of: a polymer; silicon; metal; plexi-glass; PMMA (poly methyl methacrylate); SU8; photoresist; silicone; polyvinyl alcohol (PVA); polyethyleneoxide (PEO); polyimide (PI); and plastic.

In some embodiments the polymer is Polydimethylsiloxane (PDMS).

In some embodiments fabricating the PEM comprises fabricating the PEM using at least one of: Nafion®; Nafion® membranes; BAM®; DAIS®; and ETFE-g-PSSA.

In some embodiments fabricating the PEM comprises fabricating the PEM using one of Nafion® N-115 and Nafion® N 117.

In some embodiments fabricating the PEM comprises: on the first main surface of the PEM: a) coating a thin layer of metal onto the first main surface; b) covering the thin metal layer with a layer of photoresist; c) patterning the photoresist layer with regular or irregular patterns or shapes through a mask; d) exposing the patterned photoresist layer to ultraviolet (UV) radiation; and e) removing the photoresist not exposed to the UV radiation; and repeating steps a) to e) on a second main surface of the PEM.

In some embodiments the method further comprises adding an anolyte solution to a reaction chamber of one of the at least two portions and a catholyte solution to a reaction chamber of one of the other at least two portions.

In some embodiments adding an anolyte solution comprises adding an organism that performs photosynthesis.

In some embodiments the organism is any one of: green algae; red algae; eukaryotic algae; chrysophytes; thylakoid; phytoplanktons; cyanobacteria; green sulfur bacteria; purple sulfur bacteria; purple non-sulfur bacteria or other photosynthetic bacterium; diatoms; plant tissue; chlorophyll; and chloroplast.

In some embodiments the anolyte solution comprises one or more of: growth media; mediators; and glucose.

In some embodiments adding the catholyte solution comprises adding a solution that is an electrochemically active compound with high tendency of absorbing electrons.

In some embodiments adding the catholyte solution comprises adding at least one of: ferricyanide; thionines; violo-gens; quinones; phenazines; phenoxazines, phenothiazines, iron cyanide, potassium ferrocyanide; ferric chelate complexes; ferrocene derivatives; dichlorophenolindophenol; and diaminodurene.

In some embodiments the method further comprises coupling an electrical connector to the first and second electrodes.

In some embodiments coupling the at least two portions to one another is performed using bonding techniques including oxygen plasma bonding.

In some embodiments coupling the at least two portions to one another comprises coupling more than two portions together in a manner that a single sub-power cell is comprised of two portions coupled together and the power cell is formed of multiple such sub-power cells.

In some embodiments adjacent sub-power cells share one of there reaction chambers.

In some embodiments the sub-power cells are electrically connected in either series or parallel configurations.

In some embodiments the method further comprises coupling an electrical connector to the first and second electrodes.

According to some embodiments of the invention, there is provided a power cell comprising: a proton exchange membrane (PEM) comprising a first electrode in direct contact with a first main surface and a second electrode in direct contact with a second main surface; at least two portions that collectively form the power cell, each portion comprising a reaction chamber; and at least a portion of a surface of at least one of the portions having an optically transparent window in contact with the reaction chamber to allow light into the reaction chamber.

In some embodiments a reaction chamber of one of the at least two portions comprises an anolyte solution and a reaction chamber of one of the other at least two portions comprises a catholyte solution.

In some embodiments the anolyte solution comprises an organism that performs photosynthesis.

In some embodiments the organism is any one of: green algae; red algae; eukaryotic algae; chrysophytes; thylakoid; phytoplanktons; cyanobacteria; green sulfur bacteria; purple sulfur bacteria; purple non-sulfur bacteria or other photosynthetic bacterium; diatoms; plant tissue; chlorophyll; and chloroplast.

In some embodiments the anolyte solution comprises one or more of: growth media; mediators; and glucose.

In some embodiments the catholyte solution is electrochemically active compound with high tendency of absorbing electrons.

In some embodiments the catholyte solution is at least one of: ferricyanide; thionines; viologens; quinones; phenazines; phenoxazines; phenothiazines; iron cyanide; potassium ferrocyanide; ferric chelate complexes; ferrocene derivatives; dichlorophenolindophenol; diaminodurene.

In some embodiments the PEM is sulfonated polymer including one of Nafion®, Nafion membranes, BAM®, DAIS® or ETFE-g-PSSA.

In some embodiments the at least two portions are fabricated using at least one of: a polymer; silicon; metal; glass; plexi-glass; PMMA (poly methyl methacrylate); SU8; photoresist; silicone; polyvinyl alcohol (PVA); polyethyleneoxide (PEO); polyimide (PI); or plastic.

In some embodiments the polymer is Polydimethylsiloxane (PDMS).

In some embodiments the at least two portions each comprise: at least one inlet for supplying materials to the reaction chamber; at least one outlet for removing materials from the reaction chamber; and a plurality of fluidic channels to conduct materials from the at least one inlet to the reaction chamber or conduct materials from the reaction chamber to the at least one outlet.

In some embodiments materials that are supplied to or removed from the reaction chambers include one or more of: anolyte solution; catholyte solution; glucose; mediators; culture medium; photosynthetic bio-organisms; oxygen; and carbon dioxide.

In some embodiments the optically transparent window comprises an opening in at least one of the at least two portions and a separate optically transparent covering for the opening.

In some embodiments the at least two portions comprises more than two portions, such that the power cell comprises multiple sub-power cells, wherein a single sub-power cell comprises two portions coupled together with a PEM located between the two portions.

In some embodiments adjacent sub-power cells share one of their reaction chambers.

In some embodiments the multiple sub-power cells can be electrically connected in either series or parallel configurations.

In some embodiments a pump or micropump for circulating material through at least one of the reaction chambers.

According to some embodiments of the invention, there is provided a method for generating power comprising: adding an anolyte solution to a first reaction chamber and a catholyte solution to a second reaction chamber of a power cell, the first and second reaction chambers separated by a proton exchange membrane (PEM) comprising a first electrode in direct contact with a first main surface that is part of the first reaction chamber and a second electrode in direct contact with a second main surface that is part of the second reaction chamber; and alternatingly providing durations of light and darkness to an optically transparent window in the power cell that is in contact with at least the first or the second reaction chamber to allow light into the reaction chamber.

In some embodiments the anolyte solution comprises an organism that performs photosynthesis.

In some embodiments the organism is at least one of: green algae; red algae; eukaryotic algae; chrysophytes; thylakoid; phytoplanktons; cyanobacteria; green sulfur bacteria; purple sulfur bacteria; purple non-sulfur bacteria or other photosynthetic bacterium; diatoms; plant tissue; chlorophyll; and chloroplast.

In some embodiments the anolyte solution comprises one or more of: growth media; mediators; and glucose.

In some embodiments the catholyte solution is electrochemically active compound with high tendency of absorbing electrons.

In some embodiments the catholyte solution is at least one of: ferricyanide; thionines; viologens; quinones; phenazines; phenoxazines; phenothiazines; iron cyanide; potassium ferrocyanide; ferric chelate complexes; ferrocene derivatives; dichlorophenolindophenol; and diaminodurene.

In some embodiments the PEM is sulfonated polymer including one of Nafion®, Nafion membranes, BAM®, DAIS® or ETFE-g-PSSA.

In some embodiments the method further comprises: fabricating the power cell by fabricating at least two portions that collectively form the power cell, each portion comprising one of the reaction chambers and at least one of the two portions comprising the optically transparent window in contact with the first or the second reaction chamber to allow light into the reaction chamber; fabricating the proton exchange membrane (PEM); and coupling the at least two portions to one another with the PEM located between the at least two portions.

In some embodiments the at least two portions are fabricated using at least one of: a polymer; silicon; metal; glass; plexi-glass; PMMA (poly methyl methacrylate); SU8; photoresist; silicone; polyvinyl alcohol (PVA); polyethyleneoxide (PEO); polyimide (PI); or plastic.

In some embodiments the polymer is Polydimethylsiloxane (PDMS).

In some embodiments the method further comprises circulating material through at least one of the reaction chambers.

In some embodiments circulating material through the reaction chambers comprises circulating one or more of: the anolyte solution; the catholyte solution; glucose; mediators; culture medium; photosynthetic bio-organisms; oxygen; and carbon dioxide, through at least one of the reaction chambers.

BRIEF DESCRIPTION OF THE DRAWINGS

Embodiments of the application will now be described with reference to the attached drawings in which.

DETAILED DESCRIPTION

Figure 1:
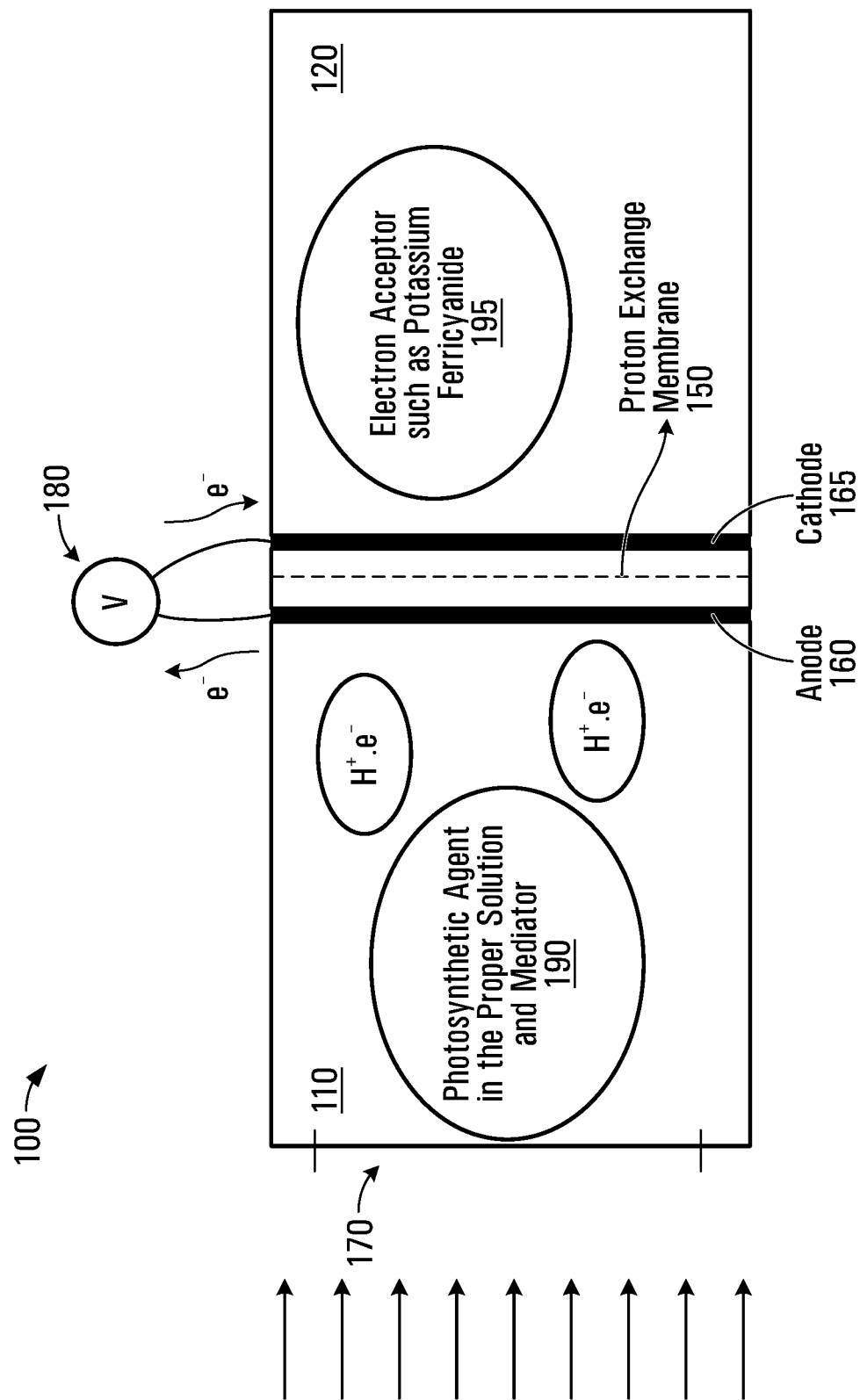
FIG. 1 is an example of a micro photosynthetic cell (μPSC) according to an embodiment of the invention.

Research has been and is currently being conducted in order to find new alternative energy sources, as well as corresponding energy harvesting devices. Devices such as solar cells and fuel cells have been studied for a considerable period of time and noticeable improvements have been achieved. However, some other potential promising energy sources have not received as much attention and focus to date. The use of photosynthesis as an energy source is the topic of this application and a micro Photosynthetic Cell (μPSC) is a corresponding energy harvesting device. Different components of polymer-based μPSCs are described herein, but these are not intended to limit the invention. Alternative implementations of the invention may include fabricating μPSC components from, for example, silicon, metal and plastic.

Like solar cells, a μPSC operates when illuminated. However, operation does not stop when the device is in darkness. In some respects the lack of illumination may help restore the device. Thus, the device can be operated continuously under light and dark conditions. Other potential advantages will be described below after discussing the operation principles of the device.

Photosynthesis

In an engineering sense, photosynthesis is the mechanism of converting light energy to chemical energy in plants. It is a complex process taking place in higher level plants, algae, phytoplankton and bacteria. In order to perform photosynthesis, these organisms require light, water and carbon dioxide for photosynthesis. Photosynthesis splits water molecules, liberates oxygen and combines hydrogen with the carbon dioxide for carbon fixation—a process leading to production of sugars and photosynthetic food. Accumulation of oxygen in the atmosphere enables living creatures to consume the photosynthesized food and derive energy from the food by "respiration"—a process in which organic compounds are oxidized back to carbon dioxide and water.

Both photosynthesis and respiration involve electron transport chains which are the basic premise of the operation of the μPSC. The electrons are released in one step and taken up in another. The idea is to interfere with the electron-transfer chain in such a way that the electrons get directed through an external load, resulting in electric current.

Photosynthesis occurs in two stages: light dependent or photosynthetic reactions and light independent or dark reactions, known collectively as the Calvin-Benson cycle. In the former, the light energy is captured and used to make high energy (excited) molecules whereas in the dark reactions the high energy molecules are used to capture carbon dioxide and make carbohydrates. By using an appropriate frequency and wavelength of light, molecules can be transformed from a defined initial state to a defined excited state.

In the light reactions, one molecule of the pigment chlorophyll absorbs one photon and loses one electron. Passing through various stages, the electron transport chain leads to the reduction of NADP (nicotinamide adenine dinucleotide phosphate) to NADPH+ (nicotinamide adenine dinucleotide phosphate-oxidase). NADP is a coenzyme used in anabolic reactions, such as lipid and nucleic acid synthesis. NADPH+ is a membrane-bound enzyme complex which generates super-oxide by transferring electrons from NADP inside the cell across the membrane and coupling the electrons to molecular oxygen to produce the super-oxide. NADP is reduced in the last step of the light reactions producing NADPH which is then used as a power source for the biosynthetic reactions in the Calvin-Benson cycle of photosynthesis. Concomitantly, the electron transport induces a pH gradient, across a thylakoid membrane of the cell, which is needed for the formation of adenosine triphosphate (ATP), a source of energy used in the biochemical reactions. The chlorophyll regains the lost electron by taking one from a water molecule through a process called photolysis, which releases oxygen.

In the dark reactions, enzymes capture $CO_2$ and release 3-carbon sugars, which are later combined to form sucrose and starch [18].

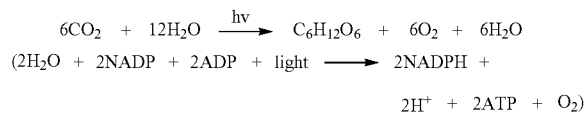

where:
ATP: Adenosine triphosphate—from photophosphorylation in which one molecule of ATP contains three phosphate groups, and it is produced by ATP synthase from inorganic phosphate and adenosine diphosphate (ADP) or adenosine monophosphate (AMP)).
NADP: Nicotinamide adenine dinucleotide phosphate—from photo reduction B. Respiration Photosynthesis and respiration are reversible bio-chemical reactions, meaning that the products of one process are the reactants for the opposite process. Hence cellular respiration is the opposite of photosynthesis; glucose or other carbohydrates oxidise to produce carbon dioxide, water and chemical energy.

Below is the cellular respiration reaction corresponding to the photosynthesis reaction mentioned earlier.

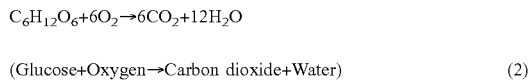

As seen above, both photosynthesis and respiration are involved with electron transport chains. As a result, the μPSC can be operated in either light or dark conditions. However, for best efficiencies and maximum lifetime of the device, cycles of light and dark conditions are suggested.

Electron transfer or moving of electrons from one site to another is among the most common chemical processes. As mentioned earlier, in the light reactions, one molecule of the pigment chlorophyll absorbs one photon and loses one electron. The released electron goes through several stages involving various electron donors and acceptors.

One of the problems that exist presently pertaining to photosynthetic energy cells is establishing the photosynthesis reaction in close proximity to the ionic and exchange transfer locations. The efficiency of energy harvesting is dependent on the proximity between the electron conducting electrodes and proton exchanging membrane and the photosynthetic organisms. Embodiments of the present invention provide a no-gap arrangement between the electron conducting metal electrodes and the proton exchanging membranes. This no-gap arrangement can also increase the surface to volume ratio of the electrodes by many times, leading to an increase of energy harvesting efficiency. The no-gap arrangement is realized in some embodiments of the invention by design of the integration of patterned electrodes with a proton exchange membrane.

Compared to other published works that use silicon, polymer is used in embodiments of the present invention to develop a new micro-fabrication process for realizing a micro photosynthetic energy cell having reduced cost, increased geometrical flexibility, increased power density and improved overall efficiency in terms of output power. The concept of realizing a no-gap arrangement for improving the efficiency of energy harvesting or electron transfer onto the electrodes is helpful for increasing the surface to volume ratio of electrodes leading to the realization of an efficient photosynthetic cell in a micro environment. In some embodiments of the present invention, the no-gap design is implemented by integrating patterned electrodes in any number of possible shapes onto both sides of the proton exchange membrane. The fabrication process is one of the differences between μPSCs fabricated based on embodiments of the present application and those known in the art. The use of polymer based materials to fabricate the μPSC as compared to silicon materials may result in faster, cheaper, and more efficient fabrication methods and elimination of some chemicals and processes, including the use of clean room facilities, which are required for silicon fabrication processes.

In previous attempts to fabricate μPSCs, in which the μPSCs are fabricated by silicon micromachining, one side of the silicon wafer is etched (patterned) to make multiple cells and to be used as the base for the electrodes which are fabricated by sputtering chrome and gold with approximate overall thickness of 2500 Å over the patterned silicon. The PEM is then sandwiched between two such silicon cells and electrolytes are injected into the chambers using syringes.

In some embodiments, a particular polymer, Polydimethylsiloxane (PDMS), is used for the main body of the device. However, it is to be understood that other materials could be used for fabricating the main body of the device. A non-limiting list of example materials includes: plastics, glass, plexi-glass, PMMA (poly methyl methacrylate), SU8, photoresist, silicone, polyvinyl alcohol (PVA) polyethyleneoxide (PEO), polyimide (PI) or any polymer material that can be used in micro fluidics.

Embodiments of the invention include a μPSC having at least two main body portions and a proton exchange membrane (PEM) sandwiched between the at least two main body portions. The main body portions are fabricated to each include a reaction chamber, a desired number of inlets, outlets and fluidic channels between the reaction chambers and inlets and outlets. The inlets and outlets may be used to supply and/or extract different fluids such as, but not limited to, live cultures, mediators and glucose, and/or gases, such as oxygen or carbon dioxide, to or from the reaction chambers.

A portion of at least one of the at least two main body portions is optically transparent. In some embodiments, the main body portion has an opening in proximity to the reaction chamber to allow the reaction chamber, and contents therein when the reaction chamber is full, to be exposed to the light. The opening may be covered with a glass cover. In some embodiments there is no physical opening, but the main body portion still includes an optically transparent window for light to access the reaction chamber. For example, the material used to fabricate the main body portion is optically transparent and in the area of the window the material may be thinner than other areas to reduce optical attenuation.

In some embodiments, some form of mechanism is attached to the µPSC at the locations of the inlets and outlets to control the volume of fluids being supplied to, or removed from, the µPSC. In some embodiments this may be precision tips, as shown in some of the figures below, but other mechanisms are contemplated as well. In some embodiments a peristaltic pump may be used for supplying/extracting fluids and/or gases, to the µPSC. In some embodiments the peristaltic pump, a syringe pump or other type of pumping device including, for example, a micropumping pump, may be used for circulating fluids/gases in and out of the µPSC.

Electrodes are directly fabricated on each of two main surfaces of the PEM by a unique process. This unique process eliminates using photo-resist remover solution which is not compatible with the PEM as well as improves operation and efficiency of the µPSC for reasons as discussed above.

The schematic of a µPSC according to some embodiments of the invention is introduced in FIG. 1.

FIG. 1 is an example of a power cell according to an embodiment of the invention. The power cell 100 includes a first reaction chamber 110, a second reaction chamber 120 and a PEM 150 having two main surfaces. The first reaction chamber 110 has an optically transparent window 170. The PEM 150 has a set of electrodes fabricated on each of the two main surfaces of the PEM 150 such that there is no gap between the electrodes and the PEM 150. In the first reaction chamber 110, the electrodes on the PEM 150 act as anode electrodes 160. In the second reaction chamber 120, the electrodes on the PEM 150 act as cathode electrodes 165. The PEM 150 and sets of anode and cathode electrodes 160,165 are located between the two reaction chambers 110,120. The optically transparent window 170 allows light into the first reaction chamber 110 to aid in the photosynthesis reaction. The electrodes 160,165 are coupled to an external load 180 to power the load.

The idea is to interfere with an electron transfer chain under external load and guide electrons in the desired direction to obtain electrical current. FIG. 1 shows electrons ($e^-$) following a path away from the anode electrodes 160 toward the external load 180 and then toward the cathode electrodes 165. A solution in the first reaction chamber 110 is an anolyte solution 190. A solution in the second reaction chamber 120 is a catholyte solution 195.

In the first reaction chamber 110, after absorption of photons, electrons ($e^-$) are released in the anolyte solution 190 and are taken up by the anode electrode 160. The electrons are transferred through the external circuit and the associated external load 180 to the cathode electrode 165 in the second reaction chamber 120 where they are reduced by the catholyte solution. This transfer of electrons creates a proton gradient which is balanced by the PEM 150.

In some embodiments the PEM is a sulfonated polymer. Other types of PEM include, but are not limited to BAM®, DAIS®, and ETFE-g-PSSA.

In some embodiments, the first reaction chamber contains an anolyte solution including live photosynthetic micro-organisms. A non-exhaustive list of possible photosynthetic micro-organisms include: green algae, red algae, eukaryotic algae, chrysophytes, thylakoid, phytoplanktons, cyanobacteria, green sulfur bacteria, purple sulfur bacteria, purple non-sulfur bacteria or other photosynthetic bacterium, diatoms, plant tissue, chlorophyll, chloroplasts. The anolyte solution may consist of whole cells or separated pigments, in all cases it contains micro-organisms. In some embodiments the anolyte solution includes growth media. In some embodiments, the anolyte solution includes mediators, such as, but not limited to methylene blue, neutral red and thionin acetate. In some embodiments, the anolyte solution includes glucose or any chemical to be used as food source for respiration. In some embodiments photosynthetic agents can be directly integrated on anode or can be contained in a corresponding growth media (e.g. HSM, CHU).

In some embodiments, the second reaction chamber contains a catholyte solution including a ferrocyanide ion solution, for example, but not limited to potassium ferrocyanide, for use as an electron acceptor. More generally, the catholyte is an electrochemically active compound with high tendency of absorbing electrons. A non-exhaustive list of possible catholyte solutions include: thionines, viologens, quinones, phenazines, phenoxazines, phenothiazines, iron cyanide, ferric chelate complexes, ferrocene derivatives, dichlorophenolindophenol, diaminodurene.

While particular examples of the PEM material, anolyte solution and catholyte solution are given above, it is to be understood that these are merely for the sake of example and the PEM material, anolyte solution and catholyte solution are implementation specific.

Figure 10:
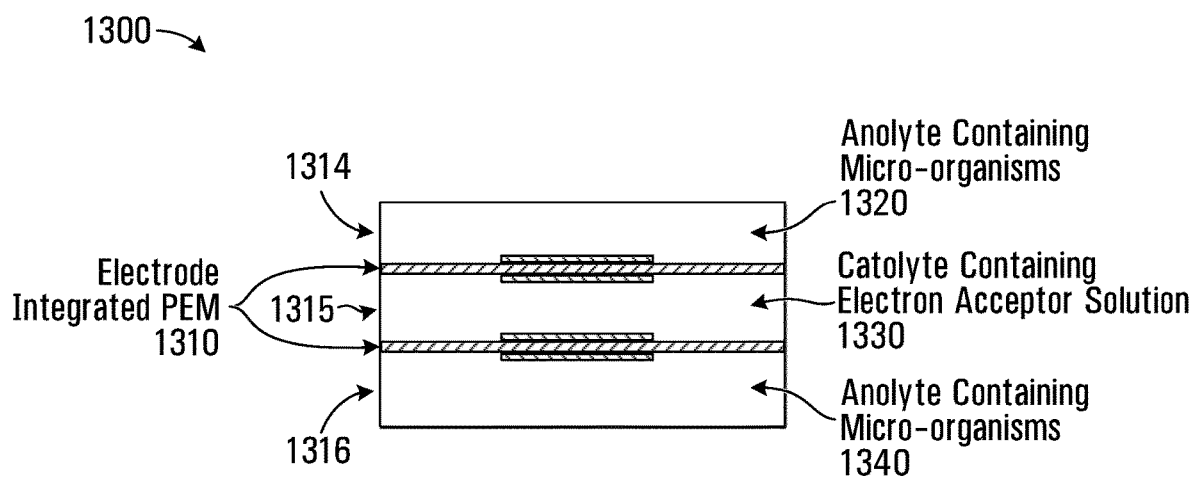
FIG. 10 is a schematic diagram of multiple main body portions stacked upon one another according to an embodiment of the invention.

FIG. 1 is an example of how two reaction chambers are coupled together to form a simple power cell having a single set of anode electrodes and a single set of cathode electrodes. In some embodiments of the invention multiple reaction chambers could be stacked one on top of another with a respective PEM between each adjacent pair of reaction chambers. FIG. 10 illustrates an example of a µPSC 1300 including three main body portions 1314,1315,1316, having respective reaction chambers, stacked upon one another with a PEM 1310 having electrodes fabricated on each side thereof between each pair of adjacent main body portions. In the example of FIG. 10 the anolyte solution 1320,1340 containing micro-organisms is in the top and bottom reaction chambers and the catholyte solution 1330 is in the middle reaction chamber. It is to be understood that any number of reaction chambers could be stacked upon each other with appropriate PEMs and solutions in each reaction chamber. It would also be possible to connect the electrodes in series or parallel configurations to vary the power supplied by the µPSC.

In some embodiments the µPSC device consists of two main body portions that are coupled together, with the PEM between them. In some embodiments the two main body portions may be identical, as the two main body portions can be substantially interchangeable. Having two identical portions may reduce fabrication cost as a single mold may be used to manufacture both portions. Alternatively, even if two different main body portions are fabricated (or three or more main body portions if for example a different middle main body portion is used in a three or more main body portion stack is fabricated), there still may be savings in using multiple pieces that can be fabricated using respective molds.

As mentioned above, a particular example of a polymer used in the fabrication of the µPSC device is poly dimethylsiloxane (PDMS). PDMS is non-toxic, non-flammable and optically transparent polymeric compound. It is easy to handle and work with and it does not require special laboratory conditions. Moreover, fabrication processes are less expensive with a wide application range.

PDMS typically consists of a PDMS base and a curing agent. When using PDMS, the PDMS base and a curing agent are mixed in a particular weight ratio, degasified and treated thermally.

Fabricating a component out of PDMS, such as the main body portions used for the µPSC, requires a mold. When designing a mold that can be used to fabricate main body portions for the µPSC, the mold may be designed so that inlets, outlets, fluidic channels and reaction chambers can be fabricated in one step. Since channels are not fabricated by etching, as in the case of fabrication with silicon, circular channels may be fabricated successfully.

Figure 2:
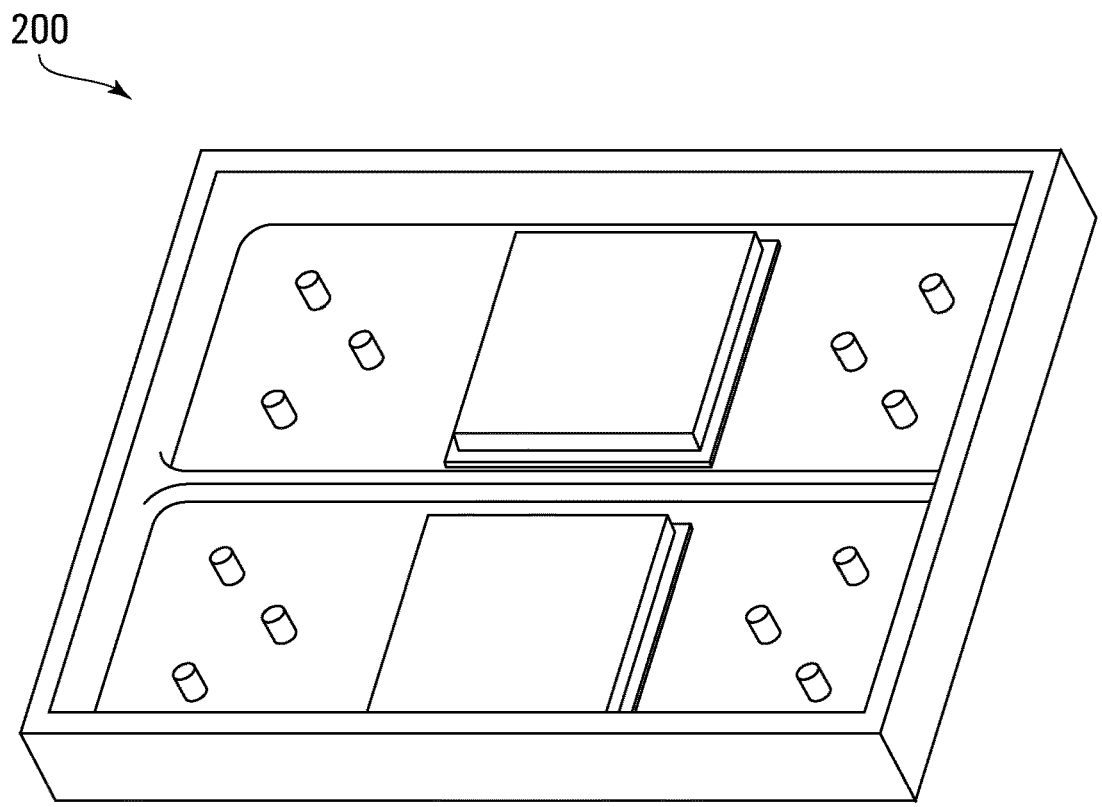
FIG. 2 is a three dimensional model of a prototype mold to fabricate a portion of a μPSC according to an embodiment of the invention.

FIG. 2 illustrates a three dimensional drawing of an example design mold 200 for use in fabrication of a main body portion element for a µPSC.

In some embodiments the mold is fabricated by computer numerical control (CNC) machining. However, other conventional machining techniques could also be used to create a mold suitable for fabricating a PDMS element for use in the µPSC device. The mold may be machined from material such as brass, steel, aluminum, or other typical metals that can be machined. In some implementations the inner surface of the mold, once machined, may be coated with gold, or other suitable material, for example by electro-plating, in order to minimize the interaction between PDMS and the mold.

In some embodiments, cylindrical features to be used to create inlets, outlets and fluidic channels are coated with gold and attached to the mold.

To create the main body portions, the PDMS base and curing agents are thoroughly mixed and poured into the mold. After pouring the uncured PDMS into the mold, the mixture is degasified using a vacuum chamber. This is in order to remove micro bubbles which may form in the mixture while mixing the PDMS base and curing agent. The degasifying time will vary depending on the volume of PDMS in the mold as well as other factors.

Baking is performed in order to finish the treatment and converting the PDMS from liquid to solid. Various baking times and temperatures can be used in fabricating the PDMS elements. For example, the mixture can be heated at 75° C. for 12 hours. Alternatively, baking can be performed in only 30 minutes when heating to approximately 125° C. However, a lower temperature and longer time provides a better bonding in general.

Figure 3A:
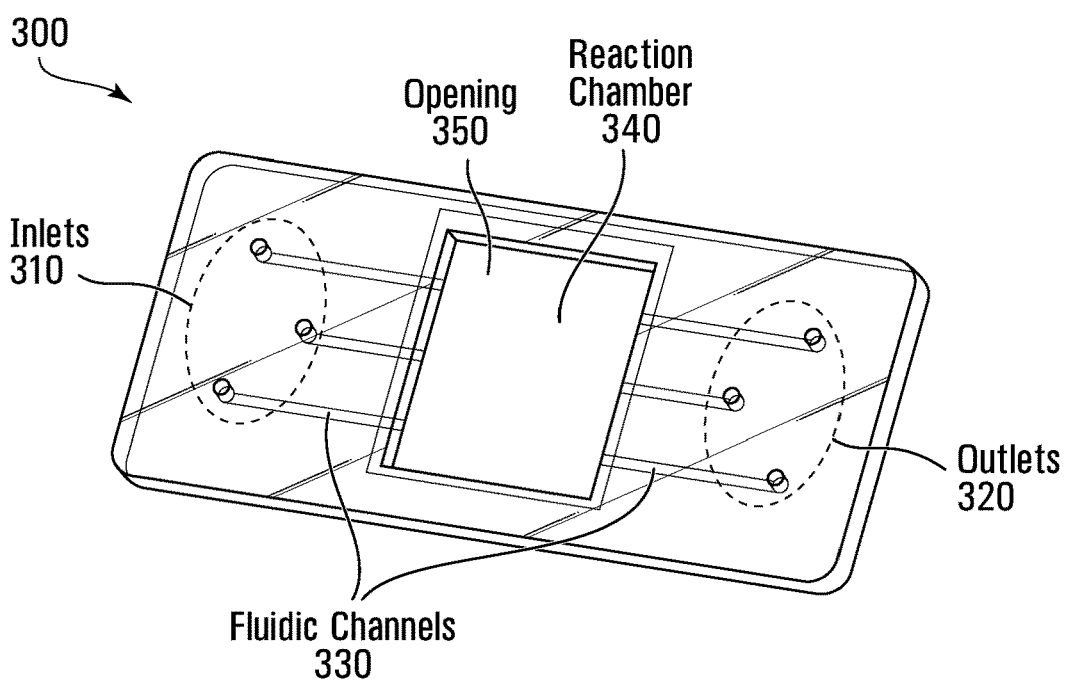
FIG. 3A is a three dimensional model of a prototype element made using the mold illustrated in FIG. 2 according to an embodiment of the invention.

FIG. 3A illustrates a prototype main body portion 300 that would result from a mold as shown in FIG. 2. The main body portion 300 has inlets 310, outlets 320, fluidic channels 330, an open volume for use as a reaction chamber 340 and an opening 350 through the main body to let light into the reaction chamber. The opening 350 is shown in FIG. 3A to be similar in length and width to that of the reaction chamber 350 to provide a maximum amount of light to reach the fluid in the reaction chamber 340. However, it is to be understood that the opening 350 may be smaller than the length and width of the reaction chamber based on a given implementation. In the particular example of FIG. 3A, there are three inlets 310 with corresponding fluidic channels 330 to the reaction chamber 340. In some embodiments, these three inlets may be used to supply three different materials, for example a first inlet supplies a solution containing microorganisms, a second inlet supplies one or more of oxygen, carbon dioxide and other gases and the third inlet supplies materials that may include one or more of mediators, glucose or other auxiliary chemicals.

While FIG. 3A describes and opening and an optically transparent covering in the main body portion, in some embodiments, there is no physical opening, but a portion of the main body portion has an optically transparent window to allow light into the reaction chamber. For example, the main body portion may be fabricated from an optically transparent material allowing light into the reaction chamber.

In some embodiments, when there is an opening in the main body portion, the opening may not be covered with an optically transparent material. The opening may be left open and exposed.

Figure 3B:
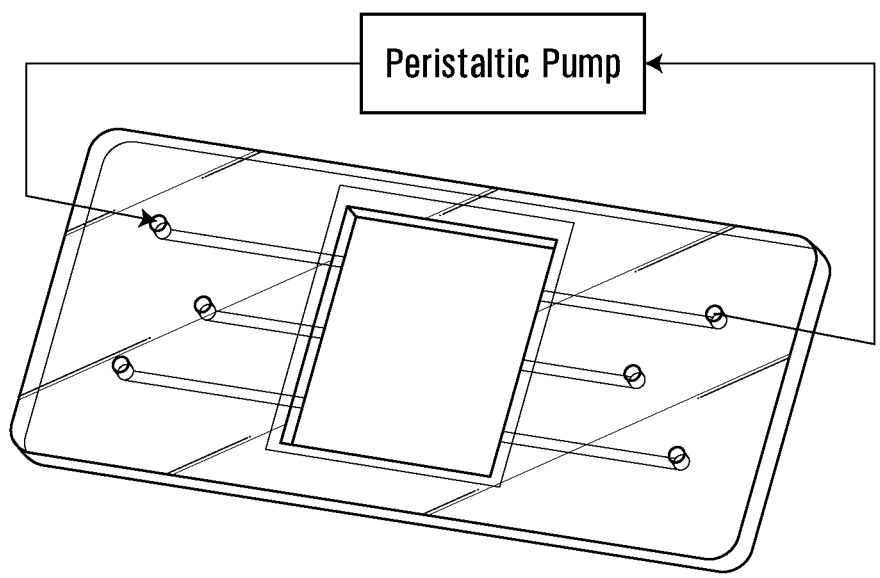
FIGS. 3B and 3C are schematic diagrams of examples of how a peristaltic pump for pumping or for micropumping may be connected to an element shown in FIG. 3A.

FIG. 3B is a schematic diagram illustrating how the main body portion of FIG. 3A could be connected to peristaltic pump, syringe pump, or any other type of pumping or micropumping device for circulating materials to the µPSC in a continuous flow.

Figure 3C:
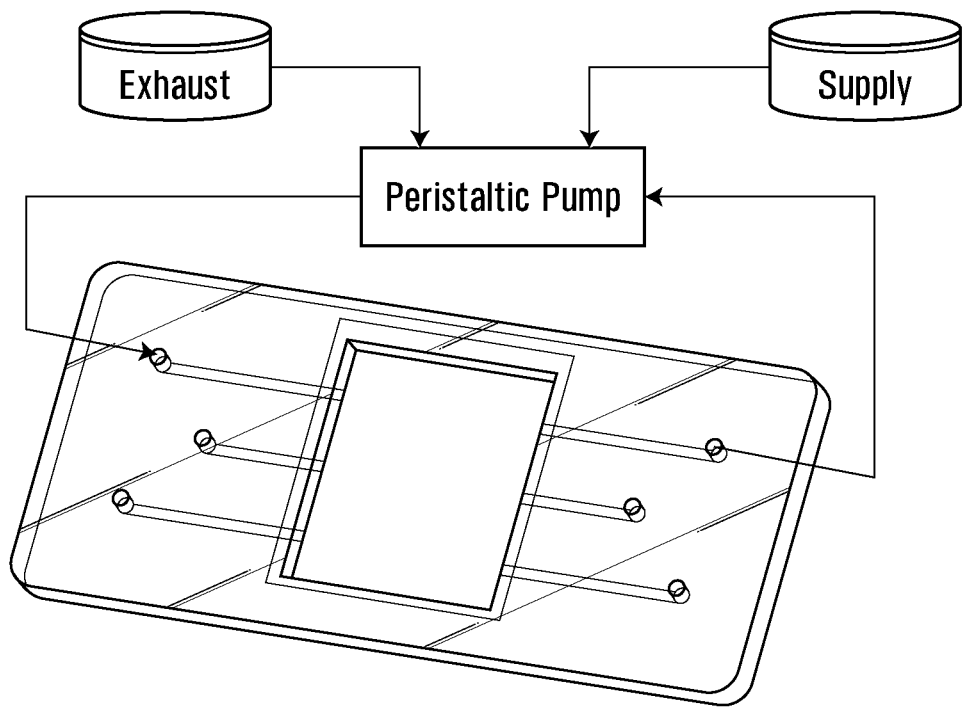

FIG. 3C is a schematic diagram illustrating how the main body portion of FIG. 3A could be connected to peristaltic pump for circulating materials to the µPSC with a supply reservoir for new materials and exhaust reservoir for used materials.

In some embodiments, the inlets may be used to supply materials to the reaction chambers, but the materials may not be circulated by a pump, they may simply be supplied and if necessary, replenished.

In some embodiments, a glass cover can be used as the optically transparent cover on the outer surfaces of the main body portions of the µPSC device.

In some embodiments a number of precision tips can be bonded to the PDMS chip in order to complete the µPSC device fabrication.

Figure 4:
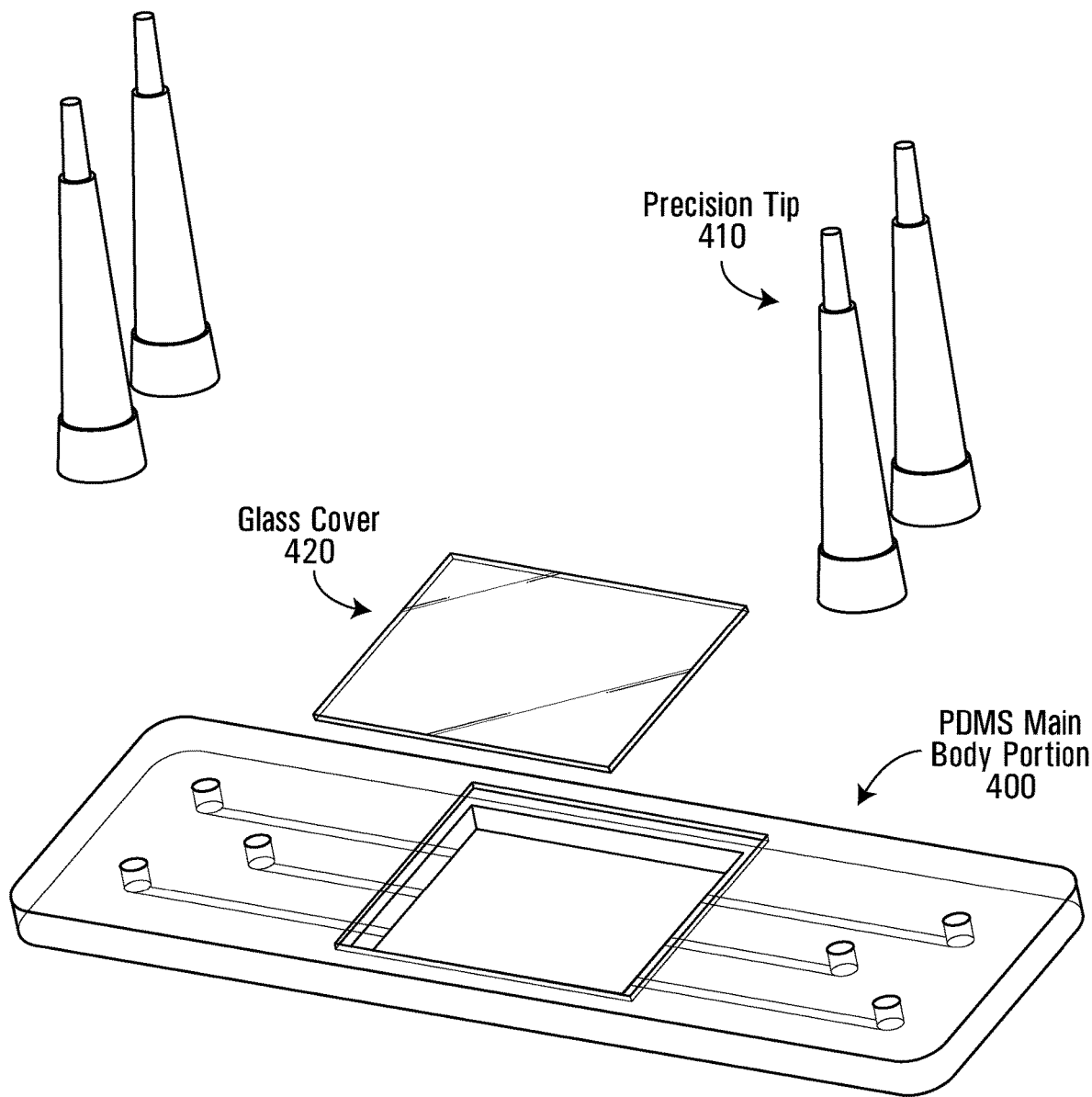
FIG. 4 is an exploded view of a model prototype of a single main body portion of a prototype μPSC device fabricated according to an embodiment of the invention.

In fabricating a prototype, precision tips were attached to the PDMS main body portions using PDMS glue and a glass cover was bonded to the PDMS main body portions using oxygen/nitrogen plasma treatment and reinforced with PDMS glue. FIG. 4 illustrates an exploded model of a PDMS prototype single main body portion 400, precision tips 410 and glass cover 420.

During fabrication of the µPSC device, before assembly of the two main body portions, inlets, outlets and fluidic channels may be observed under a microscope equipped with CCD camera to inspect for any potential defects.

In some embodiments the final assembly is achieved using oxygen plasma cleaner, PDMS glue or any other adhesives.

After assembly of the µPSC device, bonds between the main body portions or elements attached to the main body portions, and seals between elements may be checked for leakage by, for example, pumping water through the device.

Circulation of the chemicals, such as the anolyte solution, catholyte solution, culture medium, mediators, and glucose, through the chamber and channels is possible with the same lab-on-chip (LOC) setup.

Fabrication steps adopted in some embodiments of the invention may reduce or eliminate the need for clean-room processes, decrease the cost of fabricating μPSCs and reduce the time to fabricate a μPSC.

The proton exchange membrane (PEM) is an important component of electrochemical cells including fuel cells and photosynthetic cells. Some embodiments of the present invention provide PEMs fabricated with a new process for μPSC applications.

Previous studies have reported that water content, location of ionic sites, i.e. ions within the PEM structure and positive hydrogen ions, and overall proton concentration of the membrane will affect the membrane conductivity. Moreover, among potential membranes, Nafion® is a widely studied membrane due to high proton conductivity, excellent stability, good mechanical strength and commercial availability. Thickness of the membrane is a parameter that influences the performance. In particular, the thinner the membrane, the more efficient the membrane.

Nafion® membrane was developed specifically as a fuel cell proton exchange membrane. Nafion® is a sulfonated tetrafluorethylene ionomer, which is a synthetic polymer with ionic properties. In some embodiments of the present application Nafion® is selected as the PEM and additional steps are performed on the PEM to increase its ionic conductivity.

Table 1 includes three particular examples of Nafion®, which may be used in embodiments of the present invention.

TABLE 1

Properties of 3 types of Nafion ®

| PEM | Typical Thickness [μm] | Basic weight [g/m²] |
| --- | --- | --- |
| Nafion ® NRE - 212 | 50.8 | 100 |
| Nafion ® N - 115 | 127 | 250 |
| Nafion ® N - 117 | 183 | 360 |

As part of the μPSC fabrication process, after removing protective layers on both sides of the PEM, the membrane is then further treated to increase the ionic conductivity of the membrane. A particular example of how the membrane may be treated is as follows: 30 minutes in distilled water at 75° C., which hydrates the membrane and dissolves surface contamination; 30 minutes in hydrogen peroxide (3%) at 70° C., which removes organic contaminations from the surface; 30 minutes in diluted sulfuric acid (10%) at 60° C., which removes metal ion contaminations and sulfonates the membrane; and rinsing three times, each time for 30 minutes in distilled water at 75° C. The above times and temperatures are specific examples, but it is to be understood that the times and temperatures could be varied resulting in similar, improved or somewhat reduced performance in comparison.

In order to best utilize an active zone of the PEM, electrodes are integrated onto the PEM. In some embodiments, the electrodes are formed on the PEM using processes that involve photoresist, etching and removal of the photoresist. In a conventional patterning process, acetone based chemicals are used as a photoresist remover. These chemicals damage the Nafion® membrane and so an alternative process is proposed. Instead of conventional processes that use acetone based photoresist removers, developer solution is used to remove the photoresist at various stages of electrode on membrane fabrication process.

In some embodiments of the invention, a new approach has been developed to integrate electrodes on the sides of the PEM. An electrode pattern according to some embodiments of the invention is shown in FIG. 5.

Figure 5:
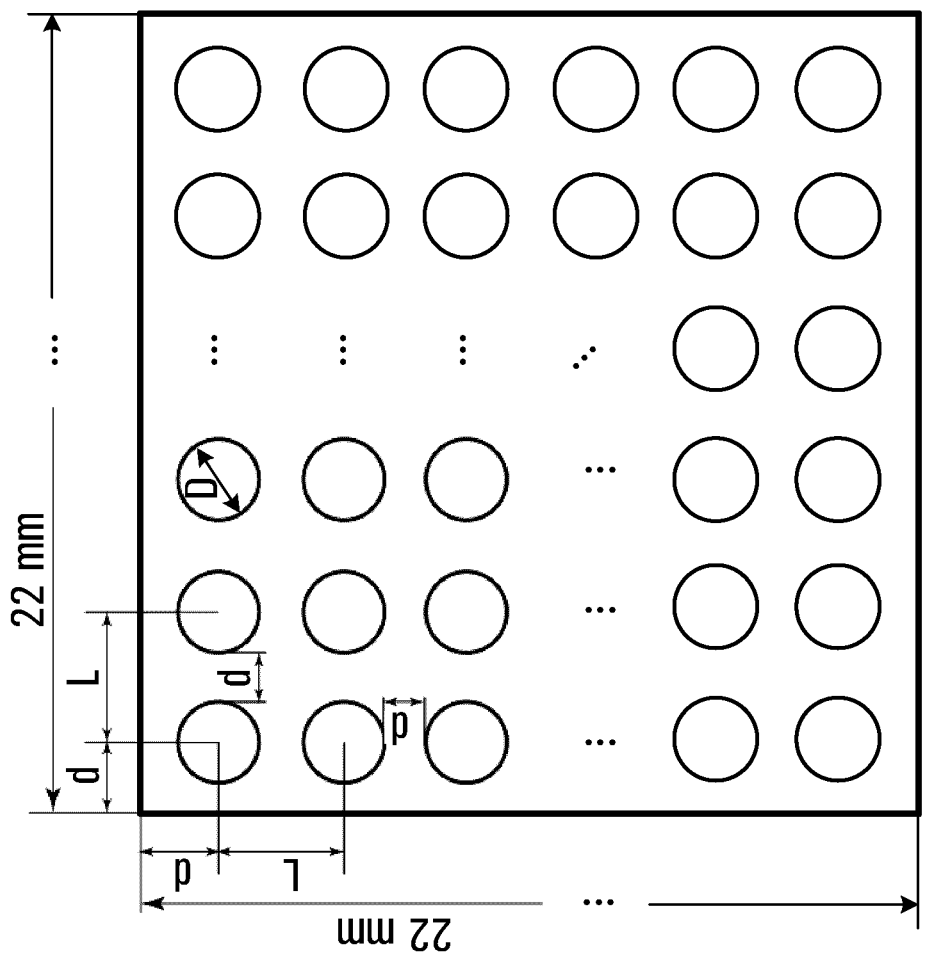
FIG. 5 is a schematic diagram of an electrode pattern for use on a proton exchange membrane (PEM) according to some embodiments of the invention used for realizing a no-gap electrode/PEM configuration.

FIG. 5 illustrates a two dimensional electrode pattern. The pattern is intended to show the relation of the size of holes in the electrode material and their associated spacing. The particular arrangement indicates a 22 mm by 22 mm square that has holes arranged in rows and columns. The size of the holes are typically in the range of tens to hundreds of microns resulting in many holes depending on the electrode size. The size and shape of the electrode and the size, shape and number of holes in the electrode are implementation specific, depending on many factors, such as, for example, the size of the PEM on which the electrodes are being attached. In FIG. 5 the spacing between the edges of the holes, in both row and column directions, is indicated to be d. The spacing between centers of the holes, in both row and column directions, is indicated to be L. The diameter of the holes is indicated to be D. While the spacing in row and column directions is illustrated to be the same, this does not necessarily need to be the case. It is possible that the spacing between edges of the electrodes or the spacing between centers of the electrodes, in the row and/or column directions, is different. Furthermore, the shape of the holes are not necessarily circular, they may be, for example, squares, ovals, diamonds or other shapes.

Table 2 provides several examples of values that may apply to variables d, D and L defining the electrode design of FIG. 5.

TABLE 2

Electrode design properties

| Pore density | D(μm) | d(μm) | L(μm) | L/d ratio | L/D ratio |
| --- | --- | --- | --- | --- | --- |
| High | 500 | 200 | 700 | 3.5 | 1.4 |
| Medium | 500 | 500 | 1000 | 2 | 2 |
| Low | 500 | 800 | 1300 | 1.5 | 2.6 |

The electrodes patterned on the PEM may be a metal such as, but not limited to gold, silver, indium tin oxide (ITO) or platinum or an alloy of those metals. The material for the electrodes can be the same material or different materials.

Figure 6A:
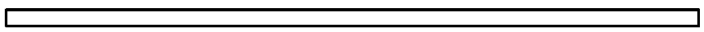
FIGS. 6A and 6B are a series of schematic diagrams that illustrate a process for realizing a no-gap arrangement by fabricating electrodes on a PEM.
Figure 6A:
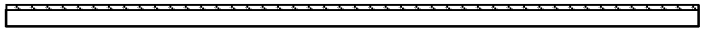
Figure 6A:
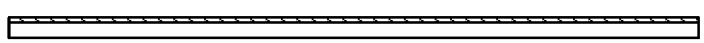
Figure 6A:
Figure 6A:
Figure 6A:
Figure 6A:
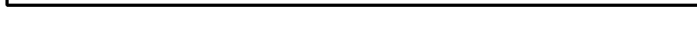
Figure 6A:
Figure 6A:
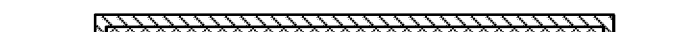
Figure 6B:
Figure 6B:
Figure 6B:
Figure 6B:
Figure 6B:
Figure 6B:
Figure 6B:

A particular example process for fabricating the electrode on the membrane is introduced in FIGS. 6A and 6B. FIGS. 6A and 6B show a series of schematic drawings that illustrate how a PEM may be fabricated with electrodes on each main surface of the PEM. Step 1 includes using a silicon wafer as a substrate to support the membrane. In some embodiments, pre-stressing the membrane prior to attachment to the silicon wafer results in a better stability of the layers during the process. In step 2, the silicon wafer is coated with a photoresist (PR) by spin coating. In step 3, the coated silicon wafer is exposed to UV radiation through a mask having a desired pattern. A purpose of the initial PR layer and patterning is alignment. The pattern is used to align the PEM once turned over, so that the holes in the electrodes on both sides are aligned. In step 4, a developer is used to remove the photoresist that is exposed to UV. In step 5, the PEM is deposited on the spacer. In step 6, the PEM is pre-stressed by attaching it to the silicon substrate. In step 7, the PEM and substrate are covered with a thin metal layer. One possible way this can be accomplished is performing metal sputtering. Other processes may involve for example, e-beam evaporation, physical vapour deposition, chemical vapour deposition, or other physical evaporation based or chemical reaction based techniques. As a particular example, the metal layer may have a thickness of 100 nm. In step 8, the metal layer is coated with photoresist. Again in step 9 the photoresist covered PEM is covered with a mask having a desired electrode pattern and is exposed to UV radiation. As a particular example the layer of photoresist may be deposited on the metal layer using a SITE Coater. A mask with a pattern shown in, for example FIG. 5, containing a desired pattern is used during the UV exposure. The desired pattern may be for example a pattern consistent with one of the sets of values in Table 2. The sample is developed after exposure to UV radiation, leaving a layer of photoresist that provides the desired pattern on the metal layer. In step 10, a developer is used to remove the photoresist that is exposed to UV. In step 11, the metal layer not covered by the remaining photoresist is etched away. In step 12, the PEM and wafer are exposed to a large exposure of UV radiation without any mask, which enables removing the remaining photoresist using the developing solution. In step 13, the photoresist is removed with the developer solution from on top of the metal electrode pattern. In step 14, the PEM is removed from the substrate, flipped over, and temporarily attached to the substrate again. Care should be taken to align the electrode pattern with the already existing pattern. This process will ensure the proper alignment between the openings on both sides of the PEM. Step 16 involves repeating steps 7 to 13 on the other surface of the PEM to fabricate electrodes on the other side of the PEM. Step 17 involves removing the PEM, with electrodes on both sides, from the silicon substrate.

FIGS. 6A and 6B are described above as being implemented on a silicon substrate, but the substrate may be some other material, such as but not limited to, metals, glass or plastics.

After a visual inspection of the electrodes fabricated on the membrane, connectivity of the electrodes is checked in order to ensure their functionality.

In some embodiments, aluminum tape sputtered with gold on top is attached to the electrodes using a conductive overcoat. Other possible material used to connect to electrodes may include gold, aluminum, copper, graphite, carbon, carbon nano tubes, Indium Tin Oxide (ITO), conductive polymers, or any other electrically conducting material that can be used to form circuits.

After fabrication and preparation of each of the components, i.e. at least two main body portions and the electrode embossed PEM, assembly and bonding of the components and any other elements, such as for example, the precision tips, is performed. An exploded view of a prototype model of a µPSC is illustrated in FIG. 7.

Figure 12:
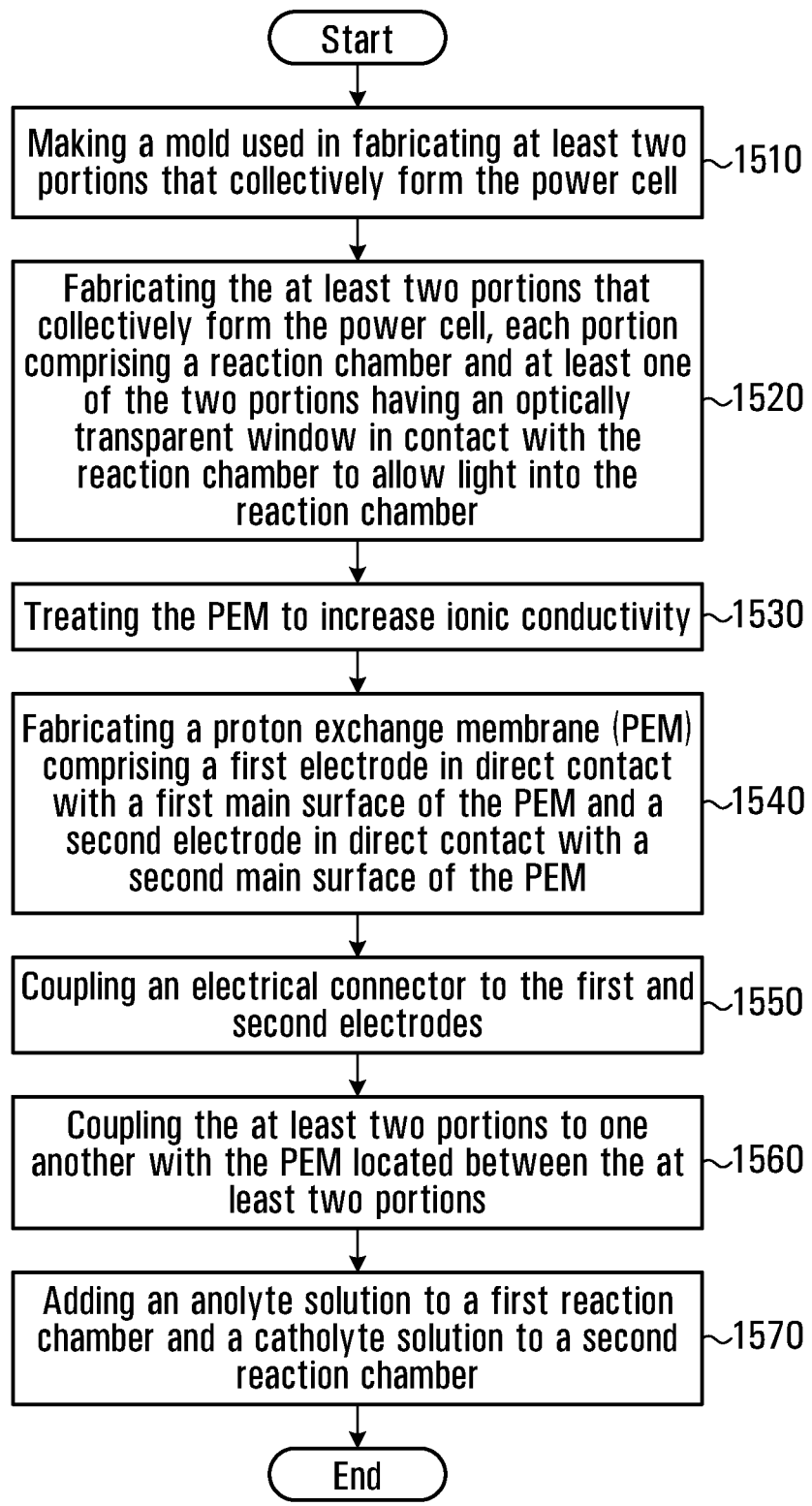
FIG. 12 is a flow chart showing a method for fabricating a μPSC device according to an embodiment of the invention.

With reference to FIG. 12, a method according to embodiments of the invention will now be described. A first step 1510 of the method involves making a mold used in fabricating at least two portions that collectively form the power cell. A second step 1520 involves fabricating at least two portions that collectively form the power cell, each portion comprising a reaction chamber and at least one of the two portions having an optically transparent window in contact with the reaction chamber to allow light into the reaction chamber. A third step 1530 involves treating the PEM to increase ionic conductivity. A fourth step 1540 involves fabricating a proton exchange membrane (PEM) comprising a first electrode in direct contact with a first main surface of the PEM and a second electrode in direct contact with a second main surface of the PEM. A fifth step 1550 involves coupling an electrical connector to the first and second electrodes. A sixth step 1560 involves coupling the at least two portions to one another with the PEM located between the at least two portions. A seventh step 1570 involves adding an anolyte solution to a first reaction chamber and a catholyte solution to a second reaction chamber.

It is to be understood that not all steps described above need to be performed each time a µPSC is fabricated. For example, once a mold is made many portions can be made from that mold. Furthermore, while it may improve efficiency of the device, it is not necessary to treat the PEM to increase ionic conductivity. In addition, the steps may be performed slightly out of the specific order as described above.

Figure 7:
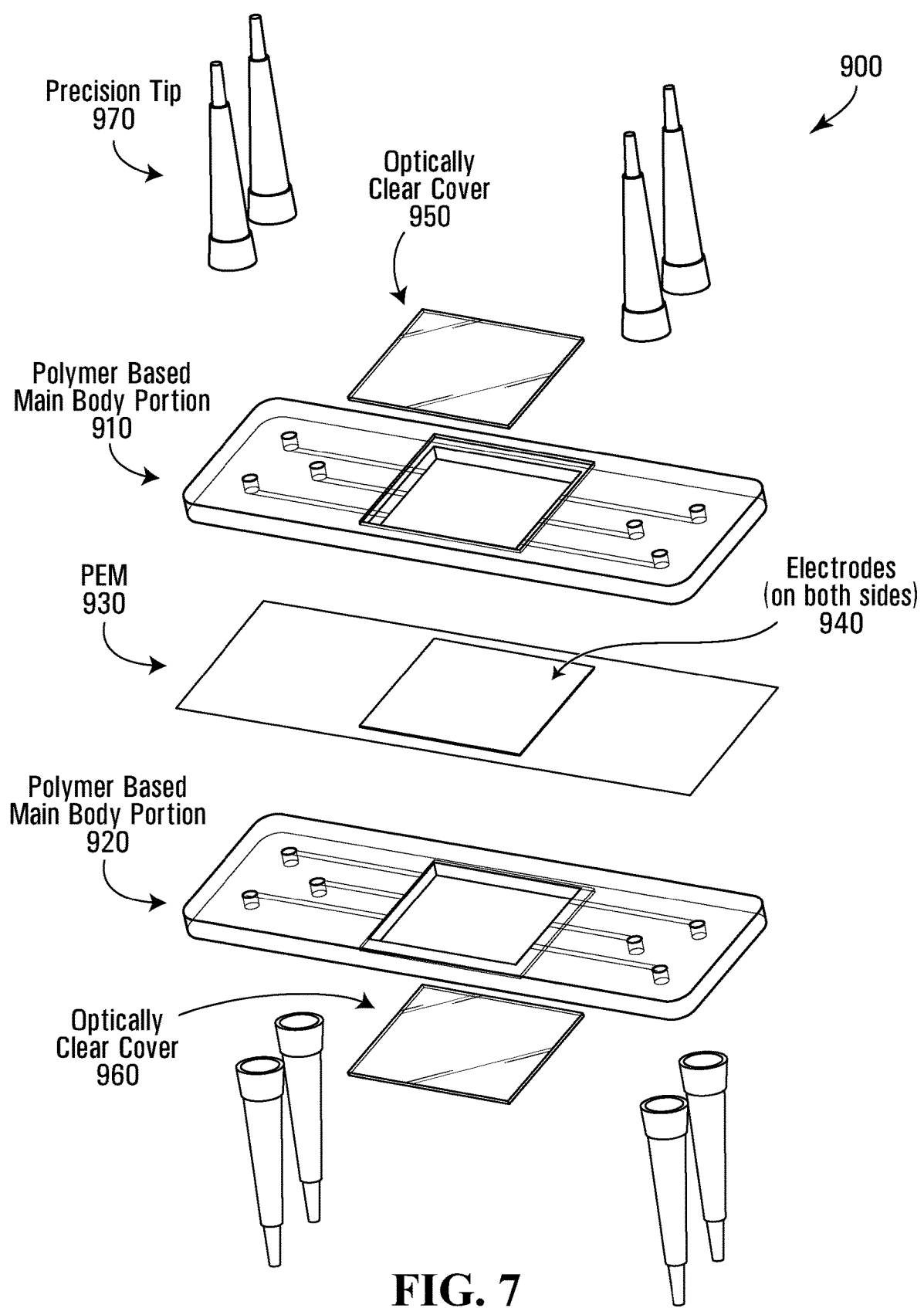
FIG. 7 is an exploded view of a model prototype of a μPSC device according to an embodiment of the invention.

FIG. 7 is an example of a power cell according to an embodiment of the invention. The power cell 900 includes a first polymer based main body portion 910 defining a first reaction chamber, a second polymer based main body portion 920 defining a second reaction chamber, a Proton Exchange Membrane (PEM) 930 having two main surfaces, a set of electrodes 940 on each surface of the PEM and two glass covers 950,960. The PEM 930 and sets of electrodes 940 are located between the two polymer based main body portions 910,920. The glass covers 950,960 are attached to the two polymer based main body portions 910,920 on respective surfaces that are opposite to a surface that is attached to the PEM 930. The respective polymer based main body portions 910,920 have inlets, outlets, and fluidic channels. Four pairs of precision tips 970 are shown in FIG. 7, which are used to add or remove precise amounts of fluids/gases to the inlets/outlets on the polymer based main body portions 910,920.

While four pairs of precision tips are shown in FIG. 7, more generally, it is to be understood that an amount of precision tips, or other mechanism for removing/adding fluids/gases, would be used that correspond to the number of inlets and outlets for each polymer based main body portion. Furthermore, it is to be understood that the precision tips may not be used at all and an alternative means for adding or removing precise volumes of fluids could be used.

In various embodiments of the invention methods for bonding two or more main body portions and particular materials that may be used include, for example, but not limited to: RTV coating (DOW CORNING 3140—Silicon rubber); PDMS glue (DOW CORNING—Silicon RTV); Pre-polymer (untreated or partially treated PDMS) and plasma treatment.

Figure 11:
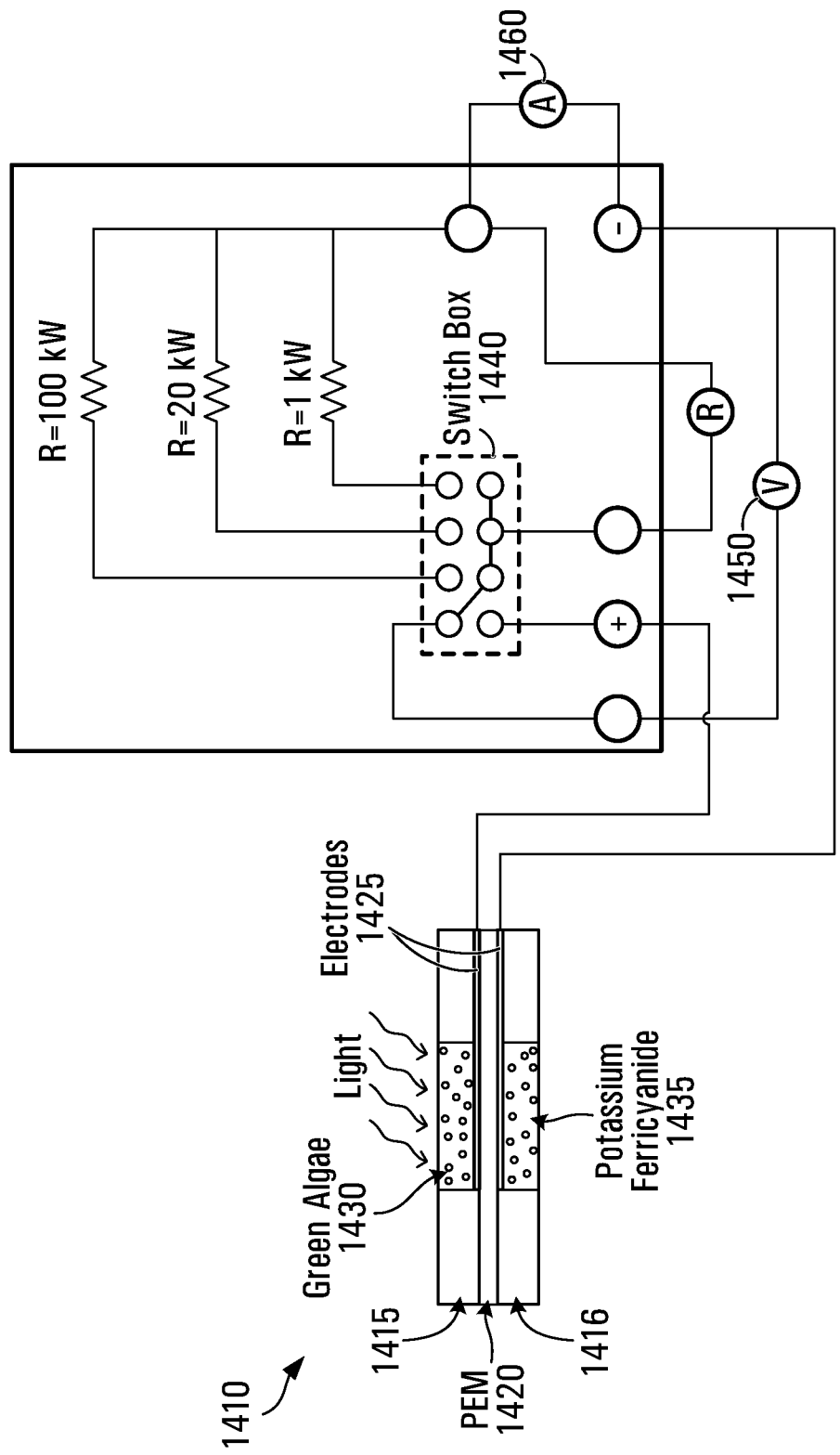
FIG. 11 is a schematic diagram of an external circuit that may be used in testing a μPSC prototype device fabricated according to an embodiment of the invention.

For the purposes of testing a particular µPSC device an external circuit was designed and fabricated to be used as the external load as shown in FIG. 11. Considering the µPSC as the power source, the external load is the resistance in the circuit. As part of the testing, three different resistor values (1 kΩ, 20 kΩ and 100 kΩ) were individually used as the load.

FIG. 11 illustrates an example µPSC 1410 having two main body portions 1415,1416 with a PEM 1420 sandwiched between, the PEM 1420 having electrodes 1425 patterned on the PEM 1420. In one reaction chamber there are green algae 1430 and the other reaction chamber there is potassium ferricyanide 1435. Light can be seen impinging on the µPSC 1410.

The electrodes 1425 are coupled to a switch box 1440 that allows three different resistors (1 kΩ, 20 kΩ and 100 kΩ) to be an external load, and the voltage 1450 and/or current 1460 to be measured.

The prototype µPSC device was tested by injecting green algae (*Chlamydomonas Reinhardtii*, strain CC125) as a photosynthetic agent (anolyte) and potassium ferrocyanide as an electron acceptor (catholyte) into the two respective reaction chambers. Numerous experiments have been conducted to examine different components and parameters.

Figure 8:
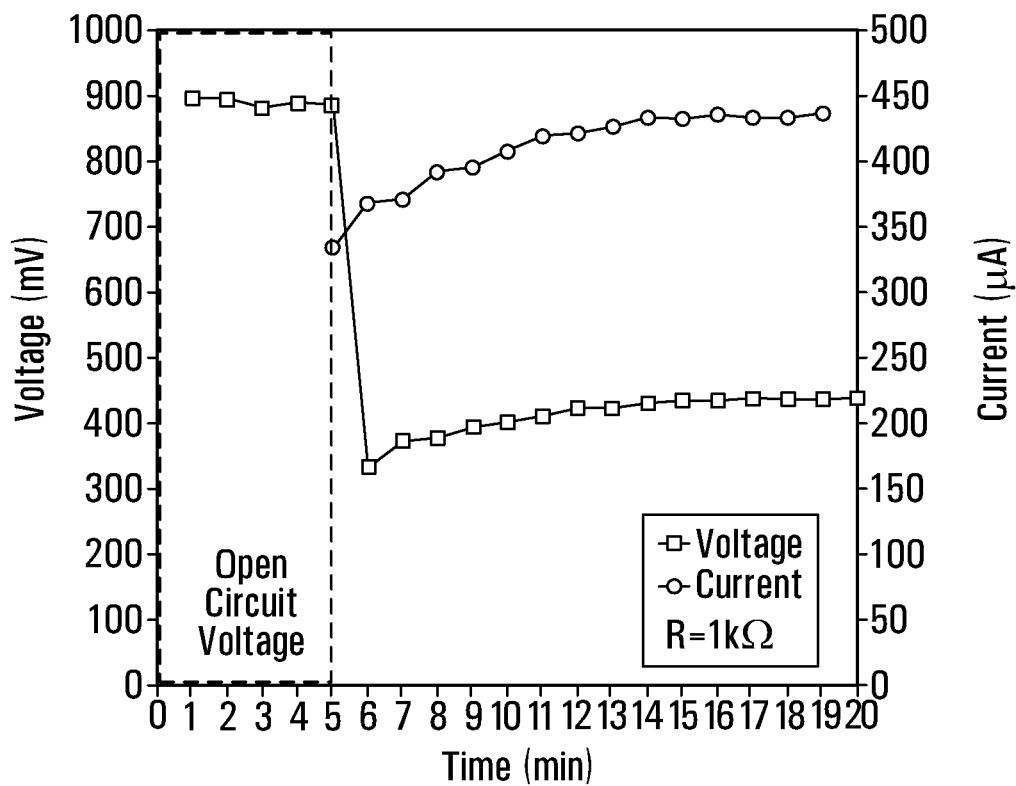
FIG. 8 is a graphical plot of output voltage and current generated by a μPSC prototype device fabricated according to an embodiment of the invention.
Figure 9:
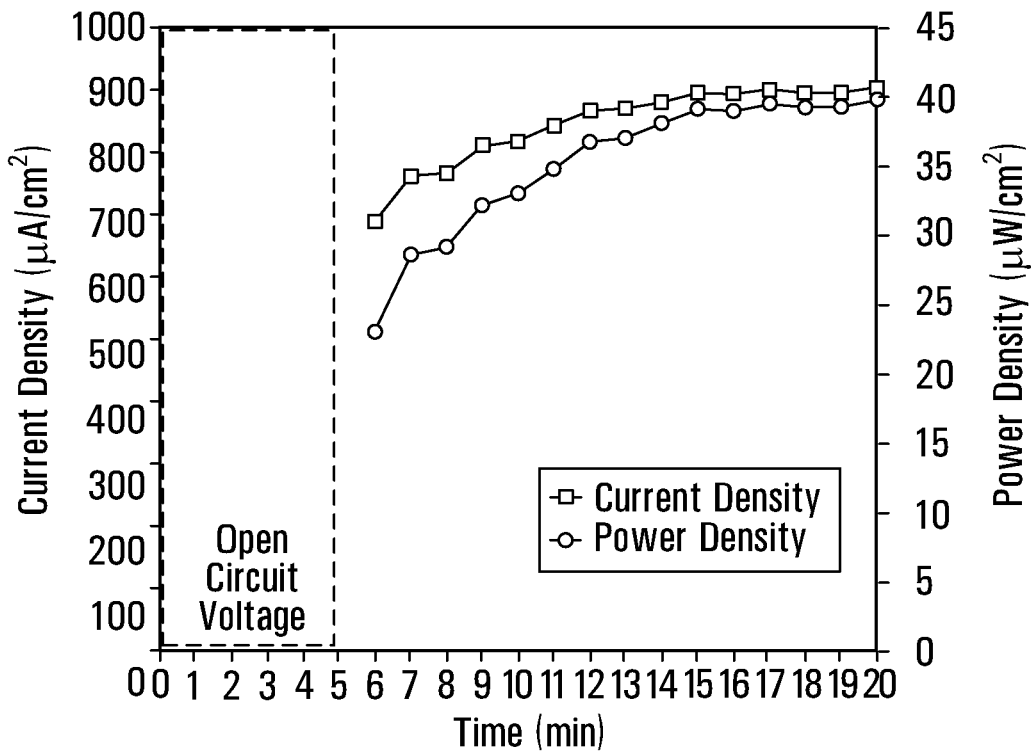
FIG. 9 is a graphical plot of current and power densities generated by a μPSC prototype device fabricated according to an embodiment of the invention.

FIG. 8 illustrates the time varying output of the device in terms of voltage and current. The first 5 minutes was monitored without any external load registering the open circuit voltage (OCV) so no current was registered during that time. This period of OCV monitoring is shown in the area denoted by a dotted line on the graphs (FIG. 8 and FIG. 9). An external load of 1 kΩ is applied to the circuit from 5 minutes to 20 minutes of the experiment.

A sudden voltage drop was observed as soon as the external load is engaged. This voltage drop depends on the load being used such that the smaller the load, the more current and lower voltage is observed. As the resistance is increased, electrons encounter more barriers to flow. Hence, current will decrease and voltage gets closer to the OCV value. As a result, one can observe that the voltage is increasing before reaching a steady value. The increasing trend of the current is the consequence of the voltage increase under the constant extreme load being used.

FIG. 9 illustrates the corresponding current and power densities. These parameters can be used for comparison purposes, expressing the output in terms of unit electrode area.

This application demonstrates the feasibility of integrating microfabricated stress free electrodes on a proton exchange membrane and realizing power generation in a microphotosynthetic power cell through simple integration and packaging technique. A polymer based photosynthetic electrochemical cell using electrodes integrated onto the proton exchange membrane has been developed. In some embodiments a three-layer technique is used consisting of two PDMS main body portions on top and bottom, and a Nafion® membrane as the proton exchange membrane integrating, with the electrodes integrated on either side. Each PDMS main body portion includes all the necessary inlets/outlets, fluid channels and the reaction chambers. Due to the fabrication method, the fluid channels may have a circular profile. The proposed fabrication method enables less expensive, easier and faster μPSC fabrication with geometrical flexibilities and simple packaging.

The results from experiments on prototype devices indicate an open circuit voltage as high as 897 mV and average closed circuit voltage of 414.06 mV under external resistance of 1 kΩ. Maximum voltage measured under the mentioned load was 441 mV. Average and maximum measured currents were 410 and 437 μA accordingly. These values correspond to power generation of 195.654 μW and current and power densities as high as 91.66 μA/cm$^2$ and 40.42 μW/cm$^2$.

While there has been extensive discussion above that the main body portions of the μPSC are fabricated from a polymer based material, in some embodiments the main body portions of the μPSC could be fabricated using silicon, plastic metal, or other appropriate materials using standard techniques of fabrication known for those materials.

Figure 13:
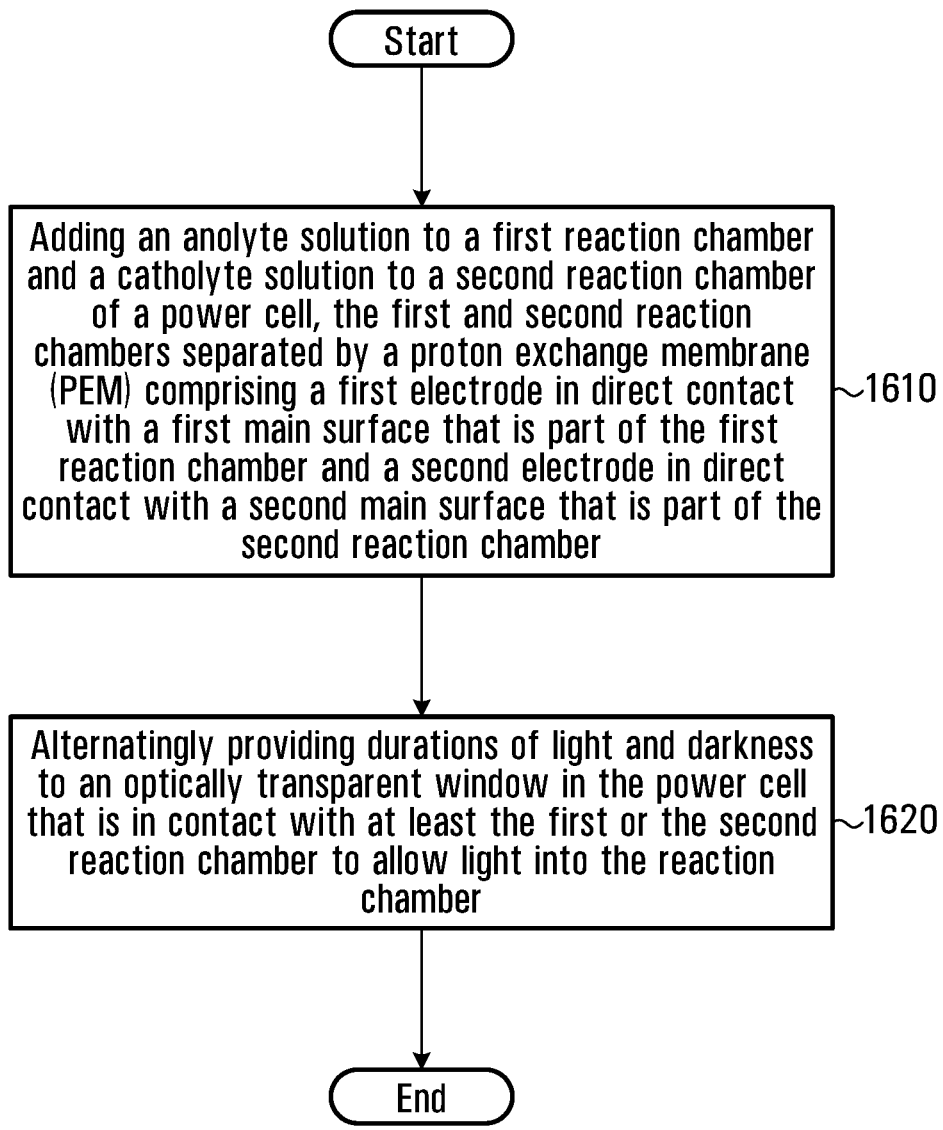
FIG. 13 is a flow chart showing a method for generating power according to an embodiment of the invention.

With reference to FIG. 13, a method according to embodiments of the invention will now be described. A first step 1610 of the method of generating power using a μPSC involves adding an anolyte solution to a first reaction chamber and a catholyte solution to a second reaction chamber of a power cell. The first and second reaction chambers are separated by a proton exchange membrane (PEM) comprising a first electrode in direct contact with a first main surface that is part of the first reaction chamber and a second electrode in direct contact with a second main surface that is part of the second reaction chamber. A second step 1620 of the method involves alternatingly providing durations of light and darkness to an optically transparent window in the power cell that is in contact with at least the first or the second reaction chamber to allow light into the reaction chamber.

In some embodiments the anolyte solution comprises an organism that performs photosynthesis. In some embodiments the organism is at least one of: green algae; red algae; eukaryotic algae; chrysophytes; thylakoid; phytoplanktons; cyanobacteria; green sulfur bacteria; purple sulfur bacteria; purple non-sulfur bacteria or other photosynthetic bacterium; diatoms; plant tissue; chlorophyll; and chloroplast.

In some embodiments the catholyte solution is at least one of: ferricyanide; thionines; viologens; quinones; phenazines; phenoxazines; phenothiazines; iron cyanide; potassium ferrocyanide; ferric chelate complexes; ferrocene derivatives; dichlorophenolindophenol; and diaminodurene.

In some embodiments the method comprises circulating material through at least one of the reaction chambers.

Circulating material through the reaction chambers may comprise circulating one or more of: the anolyte solution; the catholyte solution; glucose; mediators; culture medium; photosynthetic bio-organisms; oxygen; and carbon dioxide, through at least one of the reaction chambers.

Numerous modifications and variations of the present application are possible in light of the above teachings. It is therefore to be understood that within the scope of the appended claims, the embodiments of the application may be practised otherwise than as specifically described herein.

The invention claimed is:

1. A method for fabricating a power cell comprising at least two main body portions and a proton exchange membrane (PEM) sandwiched between the at least two main body portions, the method comprising:

fabricating the at least two main body portions that collectively form the power cell, each main body portion comprising a reaction chamber for holding an anolyte solution comprising an organism that performs photosynthesis, or a catholyte solution and at least one of the two main body portions having an optically transparent window in contact with the reaction chamber to allow light into the reaction chamber to enable a photosynthetic reaction in the organism;

coating a first thin metal layer directly on a first surface of the PEM and coating a second thin metal layer directly on a second surface of the PEM; and after said coating, coupling the at least two main body portions to one another with the PEM located between the at least two portions, wherein coating a first thin metal layer on a first surface of the PEM comprises:

on the first surface of the PEM:
 a) coating a thin gold layer onto the first surface;
 b) covering the thin gold layer with a layer of photoresist;
 c) patterning the photoresist layer with regular or irregular patterns or shapes through a mask;
 d) exposing the patterned photoresist layer to ultraviolet (UV) radiation; and
 e) removing the photoresist not exposed to the UV radiation; and repeating steps a) to e) on the second surface of the PEM.

2. The method of claim 1 further comprising fabricating the at least two main body portions using one or more of: a polymer; silicon; metal; plexi-glass; PMMA (poly methyl methacrylate); SU8; photoresist; silicone; polyvinyl alcohol (PVA); polyethyleneoxide (PEO); polyimide (PI); and plastic.

3. The method of claim 2 wherein the polymer is Polydimethylsiloxane (PDMS).

4. The method of claim 1 wherein the PEM comprises at least one of: Nafion®; Nafion® membranes; Nafion® N-115; Nafion® N-117; BAM®; DAIS®; and Ethylene-alt-TetraFluoroEthylene grafted with PolyStyreneSulfonic Acid (ETFE-g-PSSA).

5. The method of claim 1 further comprising adding the anolyte solution to a reaction chamber of one of the at least two main body portions and the catholyte solution to a reaction chamber of one of the other at least two portions.

6. The method of claim 5 wherein adding the anolyte solution comprises adding the organism that performs photosynthesis.

7. The method of claim 6 wherein the organism is any one of: green algae; red algae; eukaryotic algae; chrysophytes; thylakoid; phytoplanktons; cyanobacteria; green sulfur bacteria; purple sulfur bacteria; purple non-sulfur bacteria or other photosynthetic bacterium; diatoms; plant tissue; chlorophyll; and chloroplast.

8. The method of claim 6 wherein the anolyte solution comprises one or more of: growth media; mediators; and glucose.

9. The method of claim 5 wherein adding the catholyte solution comprises adding at least one of: ferricyanide; thionines; viologens; quinones; phenazines; phenoxazines; phenothiazines, iron cyanide, potassium ferrocyanide; ferric chelate complexes; ferrocene derivatives; dichlorophenolindophenol; and diaminodurene.

10. The method of claim 1 wherein coupling the at least two main body portions to one another comprises coupling more than two portions together in a manner that a single sub-power cell is comprised of two portions coupled together and the power cell is formed of multiple such sub-power cells.

11. The method of claim 1 further comprising, prior to coupling the at least two main body portions to one another, treating the PEM to increase ionic conductivity.

12. The method of claim 11 wherein treating the PEM comprises:
submerging the PEM in distilled water between 65° C. to 85° C. for 20 to 40 minutes;
submerging the PEM in hydrogen peroxide between 65° C. to 85° C. for 20 to 40 minutes;
submerging the PEM in diluted sulfuric acid between 50° C. to 70° C. for 20 to 40 minutes; and
rinsing the PEM at least once for 20 to 40 minutes in distilled water.

13. The method of claim 1 further comprising making a mold used in fabricating the at least two main body portions.

14. The method of claim 13 wherein making the mold comprises forming elements in the mold that form one or more of:
the reaction chamber,
at least one inlet;
at least one outlet; and
at least one fluidic channels for connect an inlet or outlet to the reaction chamber, in the at least two main body portions.

15. The method of claim 4, wherein the PEM comprises one of Nafion® N-115 and Nafion® N-117.

16. The method of claim 5, wherein adding the catholyte solution comprises adding a solution that is an electrochemically active compound with high tendency of absorbing electrons.

17. The method of claim 1 further comprising coupling an electrical connector to the first and second thin metal layers.

18. The method of claim 1, wherein coupling the at least two main body portions to one another is performed using bonding techniques including oxygen plasma bonding.

19. The method of claim 10, wherein adjacent sub-power cells share one of their reaction chambers.

20. The method of claim 10, wherein the sub-power cells are electrically connected in either series or parallel configurations.

* * * * *